UNITED STATES PATENT OFFICE 2,680,688

PROTEOLYTIC PAPAYA CONCENTRATE AND BEVERAGE AND METHODS OF PRODUCING THE SAME

Harper Moulton, Norwalk, Conn.

No Drawing. Application April 27, 1950, Serial No. 158,600

15 Claims. (Cl. 99—78)

The present invention relates to a new and improved product containing an active proteolytic enzyme system. More specifically, the invention relates to products containing extractive substances of the fruit of the papaya tree possessing such a proteolytic enzyme system.

The fruit of the papaya tree is a melon which has unusual health values because it comprises a source of a vegetable pepsin called papain which is a proteolytic enzyme of high potency capable in acid, neutral or alkaline media of hydrolyzing or breaking down proteins into peptones and into other less complex hydrolysis products of a more digestible nature. Although the fruit is very well known and highly valued in the tropical world, its introduction in the raw state into non-tropical areas has not been too successful, due mainly to the fact that the papaya is a very delicate fruit and is unable to survive the commercial handling and delays of ordinary shipment and transportation.

The commercial utilization of the fruit of the papaya tree has therefore been directed not so much to the raw fruit, itself, but to products and extracts derived therefrom.

One method of commercial utilization of the fruit has been to add sugar thereto and boil it into a concentrated syrup and to ship it in that form. One use of such a syrup is in a beverage by mixing with water, plain or carbonated, in desired proportions for consumption as a "nectar" or drink. Among the disadvantages, however, suffered by these prior preparations were: first, the absence of any proteolytic enzymatic properties; second, the persistent haze or cloudiness which developed when the papaya syrup concentrate was added to water; and, third, a loss of color in such a beverage on standing. All of these factors proved to be serious handicaps to the successful commercial exploitation and promotion of these prior papaya syrup concentrates. Additionally, many of the syrup concentrates became gelatinous and refused to dissolve or disintegrate when placed in liquids unless stirred for considerable time.

During the usual commercial conversion or processing into this concentrated syrup form, the fruit is crushed; the seeds are removed; sugar is normally added and then the mixture is heated and boiled at a high enough temperature and for a sufficient time to increase the consistency to the desired thick syrupy form. I have discovered that it is during this processing that the boiled papaya syrup loses its proteoyltic powers, even though a considerable portion of the original flavor is preserved and a palatable syrup presented to the market.

The proteolytic enzymes, originally in the fruit, are susceptible of destruction by heat and after the heating involved in the processing, are no longer present in the boiled papaya syrup concentrate as commercially sold so that the syrup is no longer an aid to digestion and cannot be advertised as having this property. Thus, the most advantageous properties of the raw fruit are missing from the commercial product and this method leaves much to be desired.

A second approach has been aimed at the latex which may be extracted from the skin or peel of the green fruit while still on the tree. Several longitudinal scratches are cut into the skin and peel and the latex oozes forth and is collected in containers. This solution of the fresh latex of the green papaya melon is known to possess the desirable powerful proteolytic enzyme but, due to the sensitiveness of the fresh latex to oxidation, half of the proteolytic power, that is, its ability or activity in hydrolyzing proteins is soon lost.

When the proteolytic enzymes are in the latex solution, they do not tend to maintain their activity very long and the stability thereof depends upon the temperature and the concentration of the solution; the nature of the solution; its basicity or acidity; the presence of micro-organisms, etc., but in no event will the proteolytic enzyme remain sufficiently active permanently.

Many attempts to prolong the life of the proteolytic enzyme system have been made in various arts such as meat tenderizing and the like by the addition to the latex of various antioxidizing, or reducing agents, but, on the whole, complete success has never been attained and this method of utilizing the advantageous properties of the latex of the papaya melon has never attained serious application.

Another method of commercial utilization of the papaya fruit is to dry the latex to a powder after collection thereof from the scrached green papaya. The latex rapidly coagulates and may be dried naturally in the air or under vacuum which yields a superior product.

The commercially developed preparations of the dried, powdered papain are considered more stable than the fresh papaya latex but even the dried powdered papain must be kept in sealed containers to prevent oxidation or it loses its activity after storage for a relatively short period of time. For example, the percentage of naturally active enzyme present in vacuum dried papain, as compared to the original activity of the fresh undried latex, remaining after storage of 45 days, has been determined to be only 17%.

My invention is concerned with a papaya syrup concentrate having a proteolytically active enzyme system which can truly and conscientiously be advertised and offered to the public as containing papain, the papaya proteinase, in proteolytically active form as a positive aid to digestion, as well as comprising a means of preparing new and delightfully flavored beverages.

A specific object of the present invention is to provide a papaya syrup concentrate possessing proteolytic enzyme activity of applicability in similar fashion to fruit preserves, jams, syrup concentrates, etc., and capable of addition to water, plain or carbonated, or other liquids, to form clear beverages which please the taste, will not change color in time, aid the digestion, and are healthful.

In accordance with this invention, papaya syrup concentrate may be made by adding papain to commercial papaya syrup. However, I have discovered that a more desirable product may be made by the following described processes.

One method of preparing the papaya syrup concentrate of my invention is as follows: the ripe papaya melons are washed, peeled and the outer rind discarded temporarily; the melon is cut open into pieces and the seeds are removed. These pieces are placed in a bowl wherein they are sliced very thin and reduced to a fine state of pulp and juice by rapidly revolving knife-like blades located in the bottom of the bowl and driven by an electric motor, running at 1500 R. P. M. or more.

The pulp so formed will be of a finer and more uniform consistency and will be disintegrated into smaller particle size than possible when the melon is worked upon by a regular juicer having a high speed rotator which presses the melon against a stator and expels the juice therefrom, together with pieces of fruit.

This fine and uniform pulpy mass may be mixed with sufficient sugar to a heavy consistency and may be used as such directly as a base for a beverage with or without added flavoring. If sugar is added, it may be, for example, in amounts up to 10% or more of cane sugar, or if economy is desired, up to 20% or more of cane sugar or syrup.

Preference has been shown by some for this beverage containing the insoluble matter and pulp and a similarity in clarity is noted to that of some fresh-fruit orange drinks of a cloudy nature. If a clear beverage or juice is desired, the pulpy mass obtained as stated above may be placed in pressing bags or a wine press and the juice is separated from the insoluble matter and pulp in very much the same fashion as is customarily done with grapes in the production of grape juice. If desired, the juice may be further filtered for increased clarity.

This papaya pulp or juice therefrom has a fine flavor, possesses proteolytic enzymatic action, and has excellent digestive properties. However, unless it is used or consumed promptly, it has been discovered that the proteolytic activity falls off rapidly with the result that such a product cannot be truthfully marketed as containing a proteolytic enzyme system. Additionally, the beverage formed from such a product will change character upon standing and become cloudy and lose color. Such disadvantages would be sufficient to preclude the product from being commercially practicable. Therefore, in order to provide a commercially successful product, the proteolytic activity must be maintained at a high level to provide for digestive properties, and the formation of cloudiness and loss of color must be prevented. This invention is directed at such processes and to the resulting products.

Sugar, flavor such as lemon and lime, or in the form of essential oils, and citric acid, or other food acids, may be added, according to taste or desire, and the mixture is then heated to a temperature of 41° C. (105.8° F.) and held at that temperature for two hours. During this time peptonization takes place and a thorough breakdown or hydrolysis of the protein matter present in the mixture occurs to yield a more digestible product.

If desired, the proteolytic enzymatic activity natural to the fruit may be augmented during the peptonization treatment by the addition of dried commercial papain in tested active form (such as Papain Merck) in proportions up to 10 parts or more of papain to a million parts of fruit (0.001%) by weight. Papain is the cheapest source of commercial proteolytic enzyme and has been a standard item on the drug market for many years. If desired, however, the expelled juice of the papaya skin or rind, or fresh papaya latex from which commercial papain is obtained, may be added in lieu of the dried powdered papain. However, if the proteinase in the natural fruit is found sufficient to peptonize the proteins, no papain need be added.

If desired, other proteinases may be added in lieu of the papain, to augment the proteolytic action with the result that lower temperature ranges would be feasible as well as shorter durations of treatment for peptonization.

If desired to pectinize the resultant solution the temperature is then raised to 60° C. (140° F.) at which point the natural pectins which cause jelly formation and which are found in the fruit of the papaya tend to dissolve into sugars or other hydrolysis products under the action of the pectinase enzyme. Approximately one hour is usually required for such pectinization until the pecteolytic action has broken down or hydrolyzed the pectins present into their simplest cleavage products.

Papain, itself, does not have any pectinase or pectolytic properties to any degree but the crushed papaya fruit pulp does have such power. If desired, a suitable pectinase may be added to the mixture prior to pectinization to insure a thorough breakdown of the pectins. When such additional pectinase is added the temperature ranges may be reduced and the duration of time of treatment correspondingly lowered. At the present time, however, the pectinase natural to the ripe papaya pulp has been found sufficient for my purposes.

The temperature is then raised to 70° C. (158° F.) at which point a saccharification of the starches present akes place wherein they are converted to malt sugar. The temperature is maintained at this level for approximately one-half hour for complete saccharification. It is believed that the papaya pulp possesses diastase properties which tend to liquefy the gelatinous dextrins to malt sugar (maltose). A starch-iodine test is usually employed to determine when all the starch has been converted. If desired, any suitable amylase, or diastase, may be added to augment the saccharification process which then would be possible at a lower temperature range and within a shorter time.

The duration of the various heating treatments above described is merely given by way of example and it is not intended as limitative of the scope of the invention. Papaya fruit varies in its composition, as do all fruits, and longer or shorter times are frequently found necessary or possible, depending upon the particular nature of the fruit being processed at the moment.

Similarly, the specific figures given for the temperatures are merely indications of preferred values. Although it is true that papain is more resistant to heat than most proteases, too high a temperature for too long a time will destroy the enzyme. It is best, as a general rule, not to heat papain for any length of time above 45° C. (113° F.).

After saccharification the liquid is raised to its boiling temperature and the papaya syrup boiled and then poured into the pressing bags, or wine presses, for separating pulp and pressing out the clarified syrup. It is to be noted that the treated syrup is now far superior to the untreated juice in many respects. The treated syrup has an improved and stronger flavor; it is clear and will not become cloudy or lose color; the protein matter has been hydrolyzed and broken down; the pectins and starches are also broken down and more digestible. However, all proteolytic activity is gone and the purpose of the remainder of the process is to cure this deficiency.

If desired, the sugar, flavoring, citric acid, etc., which were added prior to the heating for peptonization, may be added at this time instead. It is preferable to do so as late as possible in the process so as to avoid chemical or other changes in such materials during the peptonization, pectinization and saccharification.

The filtered and clarified treated papaya syrup is subjected to a concentration process which is carried out by vacuum evaporation from the start so that a lower temperature may prevail during the concentrating of the syrup. It is preferable that the temperature of the concentrating process never be allowed to exceed 70° C. (158° F.). Among other reasons for this is that the papaya syrup contains a high sugar content and excessive heating at too high a temperature would tend to caramelize the sugar. This process may be continued to concentrate the papaya syrup into a thick syrup concentrate preferably of a specific gravity approximating 1.26 (30° Baumé).

After the papaya syrup concentrate has cooled to below 37° C. (98° F.), powdered commercial papain (such as Papain Merck), is added up to proportions of 100 parts or more to a million parts of syrup concentrate (0.01%) and the mixture is thoroughly stirred and cooled to room temperature. It is essential that the papain be added to the papaya syrup concentrate at the temperature range indicated. Under no circumstances, should the papaya syrup concentrate be heated to a temperature in excess of 45° C. (113° F.) for any extended period of time, as such wound prove destructive to the papaya proteinase.

Inasmuch as commercial papain varies considerably in its proteolytic activity, the required proportions of added papain may necessarily vary. The potency of the papain used may be determined by the "Wahl test" and increases or decreases in quantities added may be calculated. The more potent the papain, the less will be required and the less potent, then the more will be required. The proportions of the papain added may thus be varied within the range from 60–110 parts depending upon the potency of the papain. A greater proportion could be used but would be normally inefficient and merely involve a surplusage of the papain present. A smaller proportion could be used, although normally not with as fully satisfactory results.

The papain, when stirred into the papaya syrup concentrate, creates the proteolytic activity and is able to maintain such activity while in such media, whereas in other liquid solutions, the proteolytic activity is soon lost. There is believed to be some cooperative and protective effect of the boiled and treated papaya syrup upon the papaya proteinase with remarkable results insofar as the maintenance of proteolytic activity is concerned. If the papain-papaya syrup concentrate is added to carbonated water, the proteolytic activity is also maintained therein. After the treated papaya syrup concentrate and the added papain have been thoroughly stirred together, the mixture is then run off into containers and each container is sealed.

The preferred papain-papaya syrup concentrate, when cooled to room temperature, has a specific gravity of 1.41 (42° Baumé), about 75% solids, may contain up to 10% or more of cane sugar, or 20% or more of corn sugar or syrup, and up to 5% or more of citric acid. The mixture is a natural peptase preservative.

The syrup may then be shipped and merchandised in that form. A bottler of carbonated beverage could purchase the syrup concentrated and mix it with carbonated water and bottle the beverage which possesses a golden color which does not change in time. It will foam and will not settle since it is homogenized. The usual bottling processes are utilizable and the customary capping with standard crown caps has been found satisfactory. Should the syrup concentrate be desired for the fountain service trade, the syrup could be used in very much the same fashion as other fruit syrups and mixed with carbonated water or plain water for immediate consumption at the fountain or used as any fruit preserve or jam on sundaes and in confections.

It has been discovered that the papain either in the syrup concentrate or in the bottled beverage form will remain proteolytically active which thus creates a totally new drink. It is not merely an improvement over the prior papaya "nectars" or drinks but possesses a constituent which they did not possess at all. Namely, the product of the present invention actually contains an active proteolytic enzyme system whereas the prior products did not. The papain-papaya syrup concentrate has been tested after a one-year storage period and has been found to be proteolytically active. The papain-papaya syrup concentrate in carbonated water has been tested after a six-months storage and also found to be proteolytically active.

It has been noticed in many instances that, when the papain-papaya syrup concentrate was added to water, the solution became cloudy in appearance notwithstanding the special treatment, apparently due to proteins associated with the enzymes. Such cloudiness does not affect the flavor, or the palatability, or digestive properties of the product and does not present any problem when the intended use is not in a clear solution. When used as a fruit preserve, or a jam, on sundaes, or in confections, or with beverages such as milk, no difficulties have been encountered.

However, such an appearance created by these proteins is disturbing in cases where a clear solution is desired in the final product such as in a bottled beverage. It is further observed that the objectionable appearance is especially present when the solution is chilled which is usually the condition in which the beverage is to be consumed.

It has been determined that the cloudy appearance has been created by the commercially prepared papain which was added in dried powdered form. I have discovered a method whereby this undesired appearance can be avoided by the use of a specially prepared papain. The papaya latex, as collected, is an aqueous solution wherein approximately one-half of the total solids consists of enzyme protein. This aqueous solution is normally dried in the air, or in vacuo, to yield the commercial product known as papain. Prior to such drying treatment, the papain water solution is first chilled to a very low temperature close to its freezing point (approximately 32° F.) under which conditions the proteins tending to create the cloudy appearance either remain suspended in the solution or slowly come out of solution to form a precipitate, which when stirred or agitated in any manner quickly rises and forms the cloudy appearance. This liquid may be filtered and the precipitate or suspended matter separated therefrom to provide a clear filtrate containing the active proteolytic enzyme. This clear solution will remain permanently unclouded even at low temperatures and is a stabilized papain solution.

Thus, when the intended use is not with a clear beverage, the commercially prepared papain is acceptable and may be used. However, when a high-grade, clear beverage is desired, the specially prepared papain extract, as described above, should be used.

An alternative method of preparation of the papaya syrup concentrate is possible wherein the papaya fruit is sliced and reduced to a pulp as described above, followed by a peptonization, pectinization and saccharification under vacuum conditions whereby the temperature is controlled and never exceeds 45° C.

Under such conditions, the papaya proteinase originally in the raw fruit is never destroyed and the necessity of adding commercial papain is obviated. Such a process, however, is slower and more difficult to control and, in view of the inexpensive nature of papain, is not as advantageous as the previously described method.

Many modifications and changes in the various components above-mentioned will be apparent and readily suggested to those skilled in the art without departing from the spirit or the scope of my invention as defined in the following claims. Portions of the improvements may, of course, be used without others.

I claim:

1. The process of making an enzyme-containing papaya fruit concentrate having proteolytic properties which comprises peptonizing papaya fruit pulp to breakdown and hydrolyze the proteins present, boiling the papaya fruit pulp to form a syrup and adding papain having proteolytic enzyme activity to the syrup at syrup temperatures not in excess of 45° C.

2. The product prepared by the process of claim 1.

3. The process of making an enzyme-containing papaya fruit concentrate having proteolytic properties which comprises pectinizing papaya fruit pulp to breakdown and dissolve the pectins present, boiling the papaya fruit pulp to form a syrup and adding papain having proteolytic enzyme activity to the syrup at syrup temperatures not in excess of 45° C.

4. The product prepared by the process of claim 3.

5. The process of making an enzyme-containing papaya fruit concentrate having proteolytic properties which comprises saccharifying papaya fruit pulp to breakdown and dissolve the starches present, boiling the papaya fruit pulp to form a syrup, and adding papain having proteolytic enzyme activity to the syrup at syrup temperatures not in excess of 45° C.

6. The product prepared by the process of claim 5.

7. The process of making an enzyme-containing papaya fruit concentrate having proteolytic properties which comprises peptonizing papaya fruit pulp to breakdown and hydrolyze the protein matter present, pectinizing said papaya fruit pulp to breakdown and dissolve the pectins present, saccharifying said papaya fruit pulp to breakdown and hydrolyze the starches present, boiling the papaya fruit pulp to form a syrup, and adding papain having proteolytic enzyme activity to the syrup at syrup temperatures not in excess of 45° C.

8. The product prepared by the process of claim 7.

9. The process of making an enzyme-containing papaya fruit concentrate having proteolytic properties which comprises reducing papaya fruit to a pulp, peptonizing said pulp to breakdown and hydrolyze the protein matter present, boiling said pulp to form a syrup and adding papain having proteolytic enzyme activity to said syrup at syrup temperatures less than 45° C.

10. The process of making an enzyme-containing papaya fruit concentrate having proteolytic properties which comprises reducing papaya fruit to a pulp, pectinizing said pulp to breakdown and dissolve the pectins present, boiling said pulp to form a syrup, and adding papain having proteolytic enzyme activity to said syrup at syrup temperatures not in excess of 45° C.

11. The process of making an enzyme-containing papaya fruit concentrate having proteolytic properties which comprises reducing papaya fruit to a pulp, saccharifying said pulp to breakdown and hydrolyze the starches present, boiling said pulp to form a syrup and adding papain having proteolytic enzyme activity to said syrup at syrup temperatures not in excess of 45° C.

12. The process of making an enzyme-containing papaya syrup concentrate having proteolytic properties which comprises reducing papaya fruit to a pulp, peptonizing said pulp to breakdown and hydrolyze the protein matter present, boiling said pulp to form a syrup, concentrating said syrup at temperatures not in excess of 70° C. to form a syrup concentrate, and adding papain having proteolytic enzyme activity to said syrup concentrate at temperatures not in excess of 45° C.

13. The process of making an enzyme-containing papaya syrup concentrate having proteolytic properties which comprises reducing papaya fruit to a pulp, pectinizing said pulp to breakdown and hydrolyze the pectins present, boiling said pulp to form a syrup, concentrating said syrup at temperatures not in excess of 70° C. to form a syrup concentrate, and adding papain having proteolytic enzyme activity to said syrup concentrate at temperatures not in excess of 45° C.

14. The process of making an enzyme-containing papaya syrup concentrate having proteolytic properties which comprises reducing papaya fruit to a pulp, saccharifying said pulp to breakdown and hydrolyze the starches present, boiling said pulp to form a syrup, concentrating said syrup at temperatures not in excess of 70° C. to form a syrup concentrate, and adding papain having proteolytic enzyme activity to said syrup concentrate at temperatures not in excess of 45° C.

15. The process of making an enzyme-containing papaya syrup concentrate having proteolytic properties which comprises reducing papaya fruit to a pulp; peptonizing said pulp to breakdown and hydrolyze the protein present; pectinizing said pulp to breakdown and hydrolyze the pectins present; saccharifying said pulp to breakdown and hydrolyze the starches present; boiling the pulp to form a syrup; concentrating said syrup at temperatures not in excess of 70° C. to form a syrup concentrate; and adding papain having proteolytic enzyme activity to said syrup concentrate at temperatures not in excess of 45° C.

References Cited in the file of this patent

UNITED STATES PATENTS

| Number | Name | Date |
|---|---|---|
| 1,338,684 | Dunlap et al. | May 4, 1920 |
| 1,561,955 | Takamine | Nov. 17, 1925 |
| 2,563,855 | McColloch et al. | Aug. 14, 1951 |

FOREIGN PATENTS

| Number | Country | Date |
|---|---|---|
| 415,868 | Great Britain | 1934 |

OTHER REFERENCES

Winton, Structure and Composition of Foods, 1935, pages 787–788, vol. II, published by John Wiley and Sons, New York.